United States Patent [19]
Bowes

[11] 3,936,027
[45] Feb. 3, 1976

[54] VIBRATION ISOLATOR
[75] Inventor: Michael A. Bowes, Windsor, Conn.
[73] Assignee: Kaman Aerospace Corporation, Bloomfield, Conn.
[22] Filed: July 22, 1974
[21] Appl. No.: 490,383

[52] U.S. Cl. ............ 248/358 AA; 248/18; 248/317
[51] Int. Cl.² .......................................... F16F 15/04
[58] Field of Search ....... 248/15, 18, 317, 329, 330, 248/331, 358 AA, 358 R

[56] References Cited
UNITED STATES PATENTS

| | | | |
|---|---|---|---|
| 2,751,179 | 6/1956 | Oravec | 248/358 AA |
| 2,894,711 | 7/1959 | Wingard et al. | 248/358 AA |
| 3,270,998 | 9/1966 | Keetch | 248/358 AA |
| 3,829,052 | 8/1974 | Flannelly | 248/317 |

Primary Examiner—Roy D. Frazier
Assistant Examiner—Robert A. Hafer
Attorney, Agent, or Firm—McCormick, Paulding & Huber

[57] ABSTRACT

An improved vibration isolator for reducing the transmission of vibrations between a supported body and a body suspended from the supporting body employs a pair of rotatable inertial masses that are coupled coaxially by an elastomeric spring. Suspension cables are wrapped around the rotatable masses and connect the masses with the supporting and the suspended body. The manner in which the cables wrap around the inertial masses causes the masses to roll back and forth along the cables when a vibratory load is applied to the cables from either one of the bodies. By appropriate tuning of the masses and elastomeric spring, the isolator can prevent the transmission of vibrations at a given frequency between the two bodies and thereby exhibits a zero impedance or transmissibility characteristic for isolating the bodies from one another insofar as the vibratory loads are concerned at the given or anti-resonant frequency.

11 Claims, 6 Drawing Figures

U.S. Patent  February 3, 1976  Sheet 1 of 2  3,936,027
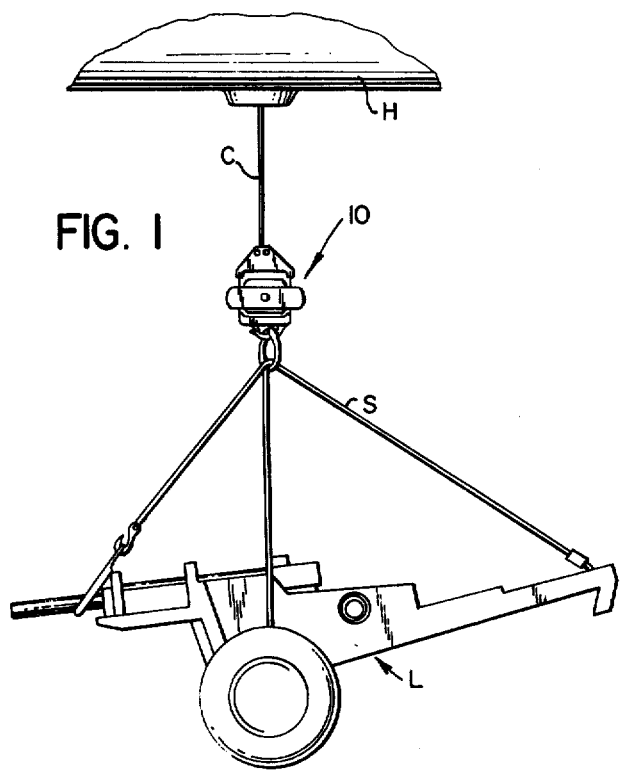
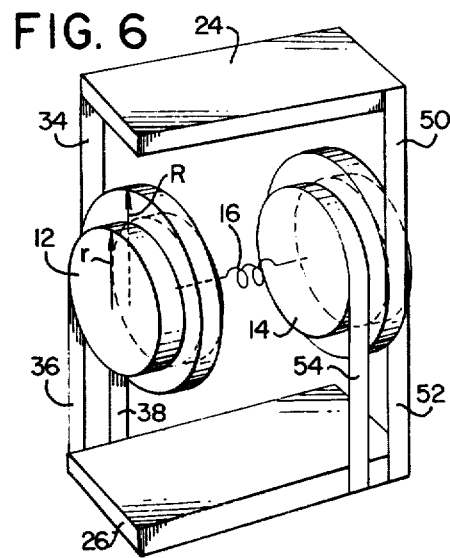
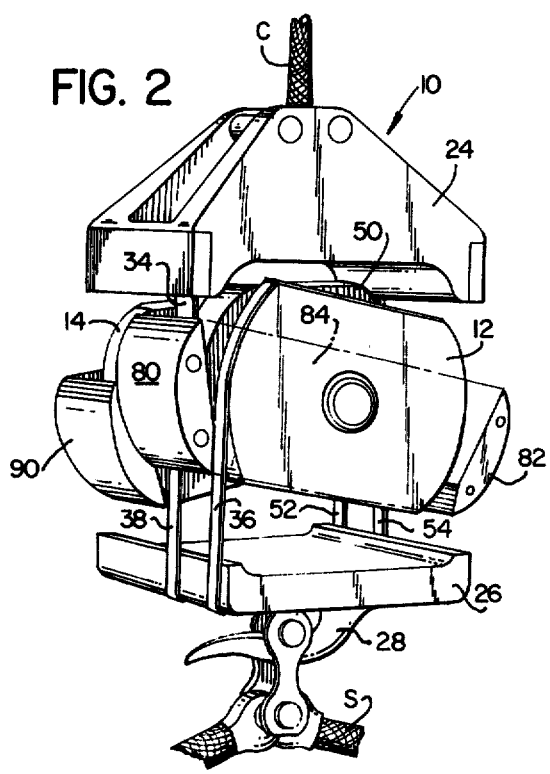
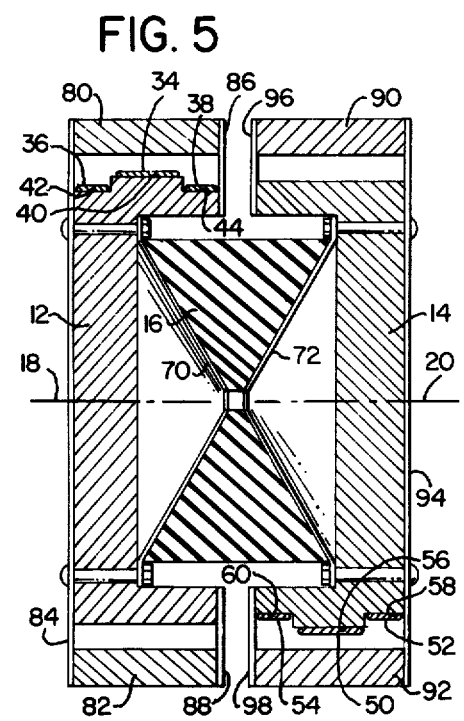

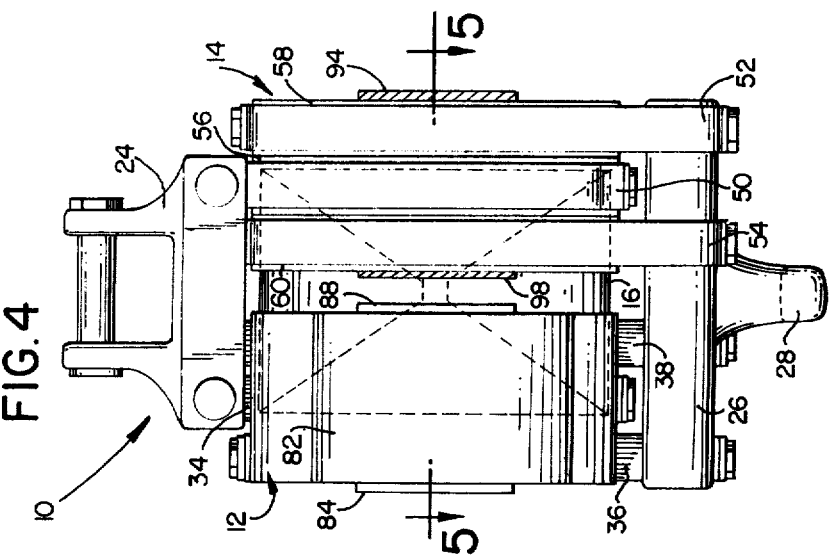
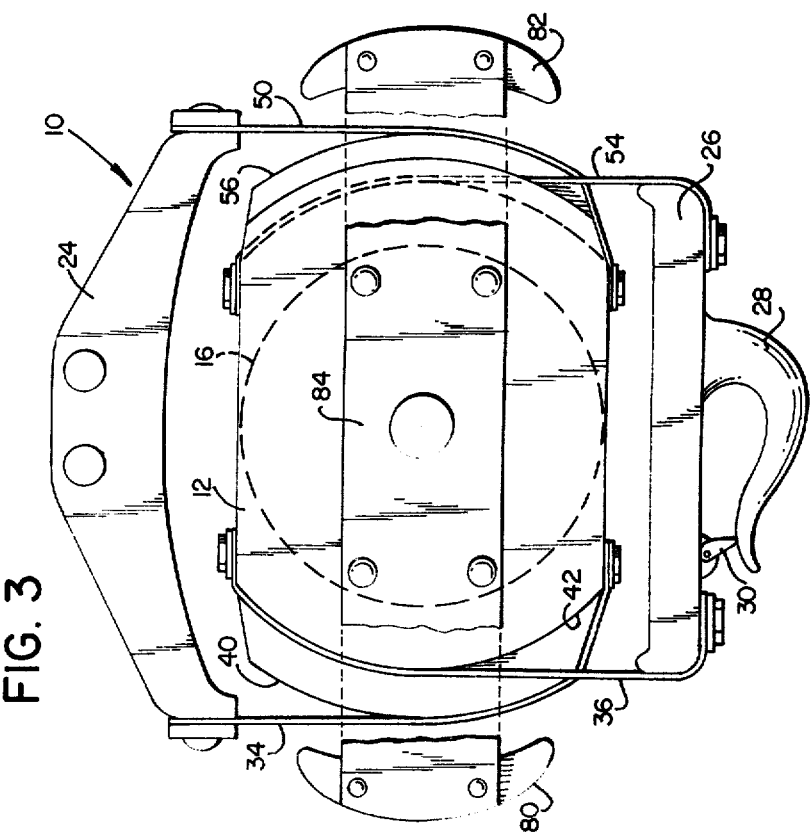

VIBRATION ISOLATOR

BACKGROUND OF THE INVENTION

The present invention relates to tuned vibration isolators or decouplers which exhibit anti-resonant characteristics. More particularly, the present invention resides in an improved isolator having resiliently connected rotatable masses and tension or suspension cables for interconnecting two bodies which are to be vibrationally isolated or decoupled from one another.

Copending U.S. Pat. application Ser. No. 249,131 filed May 1, 1972 by William G. Flannelly now U.S. Pat. No. 3,829,052, and having the same assignee as the present application discloses a vibration isolator of the type to which the present invention relates. The isolator interconnects two bodies and exhibits anti-resonant characteristics such that vibrations at a given forcing frequency generated in one of the bodies are prevented from being transmitted to the other body. The transmissibility characteristics of the isolator are said to be of zero or low impedance because the isolator prevents or substantially reduces the level at which vibrations at the given forcing frequency are transmitted between the two bodies. The bodies are, therefore, effectively decoupled insofar as vibrations at the given frequency are concerned, but are otherwise interconnected by the isolator.

The isolator disclosed in FIG. 6 of the above referenced application employs two rotatable inertial masses that are resiliently coupled with the axis of rotation spaced in parallel relationship. Tension or suspension cables are wrapped around the rotatable masses in such manner that loads transmitted between the bodies interconnected by the cables cause the masses to roll along the cables. Vibratory loads applied in addition to the static load cause the masses to roll back and forth about a static position on the cables. If the masses and the resilient element or elements coupling the masses are properly tuned, vibrations at a given frequency are dissipated in the motions of the masses and are not transmitted between the bodies.

Vibration isolators or low impedance decouplers of this type are particularly useful in the aircraft field for suspending large bulky loads from helicopters. Stability problems associated with a suspended load, the load slings and the helicopter can result in dangerous situations with potentially catastrophic consequences if vibratory forces transmitted between the helicopter and a load reach resonance. Vertical bounce produced by such vibratory forces between a helicopter and a load is not desirable and an isolator which effectively decouples the helicopter and load in the resonant frequency band is highly desirable.

Passive vibration isolators, such as mass-spring isolators, are desirable for eliminating vertical bounce between a suspended load and a helicopter or between any other coupled bodies since they are self-contained and require no power input or feedback devices. An isolator of this type should be lightweight, small in size and effective regardless of the cargo weight, the helicopter weight and the dynamic characteristics of the slings and other equipment associated with the interconnected bodies. It is also desirable that the isolator be a low maintenance item which can be achieved by eliminating bearings, pivots, linkages and other parts having sliding or pivoting elements. It is also advantageous to eliminate fluid-operated elements which may require periodic fluid replenishment or recharging and replacement of fluid seals. It is accordingly a general object of the present invention to disclose an antiresonant vibration isolator of the type shown in the above-identified patent application and possessing the desirable characteristics described above.

SUMMARY OF THE INVENTION

The present invention resides in an improved vibration isolator for reducing or preventing the transmission of vibrations at a given frequency between a first body in which a vibratory excitation force may originate and a second body coupled to the first by the isolator.

The isolator of the present invention comprises first and second inertial members having a specific weight or mass and defining at least two cylindrical surfaces. The two surfaces on each member have different radii of curvature and are located on the members coaxially of axes of rotation of the members. The first and second members are resiliently interconnected so that the axes of rotation are coaxial and the resilient means interconnecting the coaxial members permits them to rotate in opposite directions about their axes relative to one another with resilient restraint. In the preferred embodiment of the invention, the resilient means is an elastomeric torsion spring having an annular configuration and is positioned so that the spring and the two inertial members are all coaxial.

First cable means is connected at one end to the first inertial member and extends from the member tangentially of one of the cylindrical surfaces having the larger radius of curvature to the first body connected with the isolator. Second cable means is connected at one end to the first inertial member and extends from the member tangentially of the other of the cylindrical surfaces having the smaller radius of curvature to the second body. The first and second cable means usually extend in opposite directions from the first member to the first and second bodies respectively.

In a similar manner, third and fourth cable means are connected to the second inertial member tangentially of the cylindrical surfaces having the larger and smaller radii of curvature respectively and connect with the first and second bodies respectively. The first and third cable means are tangent to the first and second inertial members respectively at points of tangency on diametrically opposite sides of the coaxially positioned members. The second and fourth cable means extended to the first and second bodies respectively from points of tangency on the same sides of the members as the first and third cables respectively. Such arrangement of the cables and the resilient means interconnecting the inertial members causes the inertial members to rotate in opposite directions about their axes with resilient restraint and to roll toward the first or second body by an amount proportional to the loads applied to the cables between the bodies. Static loads cause the inertial members to roll along the cable means to a given static position and vibratory loads superimposed on the static loads cause the inertial members to rotate and translate along the cables in an oscillatory motion about the static position. By tuning the resilient means and the inertial members to a specific anti-resonant frequency, the isolator effectively decouples the first and second bodies at that frequency.

The isolator carries no external power source nor a heat sink to dissipate energy. In contrast to the isolator disclosed in the above-identified application, the inertial members are interconnected by the resilient means in a coaxial configuration which insures a more precise response of the inertial members to vibratory excitation under various conditions. The present isolator also has a more compact configuration and, can be tuned to various anti-resonant frequencies more easily.

BRIEF DESCRIPTION OF THE DRAWINGS

FIG. 1 shows the improved vibration isolator of the present invention between a helicopter and a suspended cargo load.

FIG. 2 is a perspective view showing the general configuration of the improved vibration isolator of the present invention in one embodiment.

FIG. 3 is a front elevation view of the improved isolator in FIG. 2.

FIG. 4 is a side elevation view of the isolator in FIG. 3.

FIG. 5 is a sectional view of the isolator as viewed along the sectioning line 5—5 in FIG. 4.

FIG. 6 is a perspective view of a dynamic model of the improved isolator.

DESCRIPTION OF THE PREFERRED EMBODIMENTS

In FIG. 1, the improved isolator of the present invention, generally designated 10, is shown installed between the cargo cable C of a helicopter H and the lifting sling S holding a load L in the form of a howitzer. Although this is a typical installation of the isolator, it can be used between other bodies which are interconnected by suspension cables or other members which are under continuous tension.

The isolator 10 has particular utility in the illustrated environment in view of its capability of preventing the transmission of vertical excitation forces between the helicopter H and suspended cargo load L. Most frequently, a helicopter generates vertical excitation forces at frequencies directly proportional to the rotor speed. These excitation frequencies characteristically lie in the range from 2 to 6 cps and within this range they pose a considerable threat to the interconnected helicopter and cargo load. An unstable condition in flight can produce excessive vertical bounce with potentially catastrophic results and may require that the suspended load be sacrificed by releasing it in order to save the helicopter and crew. It is, accordingly, highly desirable to utilize a vibration isolator of the type disclosed hereinafter which is substantially maintenance-free and completely self-contained to provide the necessary isolation between the helicopter and suspended load. The improved isolator of the present invention can be used either singly as illustrated in FIG. 1 or in parallel groupings.

FIGS. 2-5 illustrate the improved isolator of the present invention in greater detail. The isolator is comprised in part of two rotatable inertial masses 12 and 14 coaxially interconnected by means of an elastomeric torsional spring 16. The spring permits the masses to rotate relative to one another in opposite directions about their respective axes of rotation 18 and 20 shown most clearly in the sectional view of FIG. 5. Equal but opposite torques are applied to the masses 12 and 14 by means of a plurality of cables which extend tangentially of cylindrical surfaces on the masses to an upper coupling 24 and a lower coupling 26. The upper coupling is connected to the cargo cable C from the helicopter while the lower coupling 26 includes a cargo hook 28 for attaching the isolator 10 to the sling S of the suspended load L as shown most clearly in FIG. 1. The cargo hook 28 includes a pivotable latch 30 actuated by a release cable (not shown) for locking and releasing a suspended load in the hook 28.

The cables connected to the mass 12 include the cable 34 connected to the coupling 24 and cables 36 and 38 connected to the coupling 26. As seen most clearly in FIG. 3, the cable 34 extends tangentially of a cylindrical surface 40 on the mass 12 upwardly to the coupling 24 while the cable 36 extends tangentially of a cylindrical surface 42 downwardly to the coupling 26. The cable 38 also extends downwardly from a cylindrical surface 44 shown in FIG. 5 having the same radius of curvature as the surface 42.

It will be observed that the cylindrical surfaces 40, 42 and 44 are located on the mass 12 coaxially of the axis 18 and that the radius of curvature of the surface 40 is slightly larger than that of the surfaces 42 and 44. Also, the surfaces 42 and 44 are disposed at axially opposite sides of the surface 40 in a symmetric arrangement. With such an arrangement and geometry, forces applied by the cables 34, 36 and 38 to the mass 12 when a load L is connected to the cargo hook 28 generate a torque upon the mass 12 which rotates the mass in opposition to the elastomeric spring 16 in the clockwise direction as viewed in FIGS. 2 and 3 so that the mass assumes a rotationally displaced position such as shown in FIG. 2.

Another set of cables 50, 52 and 54 corresponding to the cables 34, 36 and 38 respectively are connected between the mass 14 and the couplings 24 and 26. The cable 50 extends tangentially from a cylindrical surface 56 upwardly to the coupling 24 while the cables 52 and 54 extend tangentially of cylindrical surfaces 58 and 60 respectively downwardly to the coupling 26. The cylindrical surfaces 56, 58 and 60 correspond respectively to the cylindrical surfaces 40, 42 and 44 on the mass 12 and are located on the mass 14 coaxially of the axis 20. The radius of curvature of the surface 56 is the same as the radius of curvature of the cylindrical surface 40 and the surfaces 58 and 60 have the same radius of curvature which is smaller than the radius of curvature of the surface 56 and equal to the radius of curvature of the surfaces 42 and 44.

Forces applied to the mass 14 by the cables 50, 52 and 54 generate a torque upon the mass in the same manner as the cables 34, 36 and 38 when a load is suspended from the cargo hook 28. Since the cables 50, 52 and 54 are disposed at one side of the coaxial axes 18 and 20 diametrically opposite the cables 34, 36 and 38 and since the radii of curvature of corresponding cylindrical surfaces on the masses are equal, the torque applied to the mass 14 by a suspended load will be equal but opposite that torque applied to the mass 12. Accordingly, the mass 14 is rotated in a counter-clockwise direction as viewed in FIGS. 2 and 3 about the axis 20 and the mass assumes a rotationally displaced position such as shown in FIG. 2 under static load.

The elastomeric spring 16 interconnecting the masses 12 and 14 inter-reacts the equal but opposite torques applied to the masses and limits the rotational displacements of the masses to amounts proportional to the torques. Since the cable 34 is disposed symmetrically between the cables 36 and 38 and since the cable 50 is also disposed symmetrically between the cables 52 and 54, no bending moments are generated or transmitted from one mass to the other through the spring 16. The static tension loads applied to the respective masses by the cables are balanced and the torsional loading of the masses by the cables is balanced by the elastomeric spring 16. Accordingly, all static loads and torques on the masses 12 and 14 are balanced and result in equal but opposite rotations of the masses relative to one another about the axes 18 and 20. Such rotations result in simultaneous vertical displacements of the masses 12 and 14 and the spring 16 downwardly when a cargo load is attached to the cargo hook 28 or upwardly when a load is released. The couplings 24 and 26, correspondingly, move vertically relative to one another with the vertical and rotational motions of the masses.

Due to the simultaneous vertical motion of the masses 12 and 14 it is possible to mount the masses on a common shaft extending coaxially of the axes 18 and 20. Such a shaft, though not essential, insures coaxial alignment of the masses and also permits one of the cables 36 or 38 and one of the cables 52 or 54 to be eliminated if desired. The elimination of the cables introduces bending moments that would be transferred between the masses by the shaft, but would not otherwise interfere with the isolator operation.

The elastomer spring 16 is a body of revolution and has a toroidal or annular configuration formed by revolving a trapezoid about the collinear axes 18 and 20. The trapezoidal cross-section of the spring provides relatively constant shear stress at each radial of the spring and also provides the greatest cross-section of the spring and resistance to bending at the longest of the parallel sides of the trapezoid for holding the masses 12 and 14 in axial alignment. Of course, it is not essential that the elastomeric spring 16 have the illustrated cross-section and it is also contemplated that other resilient means may be utilized in place of the spring 16. The elastomeric spring is, however, preferred since it is a completely passive element and requires little or no maintenance. Also, the illustrated spring 16 is relatively easy to manufacture for attachment to the masses 12 and 14. The spring is formed in a curing mold and during the curing process, a pair of conical end plates 70 and 72 are bonded to the elastomeric material which is preferably a natural rubber of 40 durometer. The mold and plates impart the annular configuration to the spring. Curing the spring in this fashion provides a high strength bond between the metal plates and the rubber so that the plates and rubber will not separate when placed in shear by the torsional forces applied to the masses 12 and 14. The plates are then bolted or otherwise connected to the masses to provide the required interconnection.

Inertial fly weights are also connected to the masses 12 and 14 to permit the anti-resonance characteristics of the isolator 10 to be adjusted. Fly weights 80 and 82 are connected to the mass 12 at positions diametrically opposite one another and symmetrically located about the axis 18 by means of side plates 84, 86 and 88 shown most clearly in FIG. 5. In a similar manner, fly weights 90 and 92 are connected to the mass 14 at positions diametrically opposite one another and symmetrically located about the axis 20 by means of side plates 94, 96 and 98. By appropriate selection of the masses 12 and 14, the spring 16 and the fly weights 80, 82, 90 and 92, the dynamic characteristics as well as the static characteristics of the isolator are determined. Of course, the dynamic characteristics are selected to decouple or isolate vibrational forces originating in either the load L or the helicopter H.

A brief analytical discussion of the isolator follows in conjunction with the dynamic model of the isolator shown in FIG. 6. For simplicity, the fly weights 80, 82, 90 and 92 are not illustrated and their dynamic parameters are considered to be included within the parameters for the masses 12 and 14. Also, the dynamic components of the isolator 10 are illustrated in simplified forms for ease of understanding.

The steady state equation of motion for the interconnected helicopter H, isolator 10 and load L can be obtained be setting up the kinetic and potential energy equations for the system and by using Lagrange's equation. Vertical displacement transfer impedances through the isolator from the load to the helicopter and from the helicopter to the load or the ratios of the load and helicopter displacements are derived from the equations of motion and can be shown to be equal which indicates that the operation of the isolator is the same regardless of whether the source of a vibratory force is in the load or the helicopter. From the transfer impedances, it can be determined that the anti-resonant frequency of the isolator is given by the simplified expression:

$$\omega^2 = \frac{4k}{MrR + I}$$

wherein
$k$ = torsional spring rate of the elastomeric spring 16,
$R$ = larger radius on the masses 12 and 14,
$r$ = smaller radius on the masses 12 and 14,
$M$ = total mass of masses 12 and 14, and
$I$ = total moment of inertia of masses 12 and 14 about collinear axes 18 and 20.

The antiresonant frequency is the forcing frequency at which the isolator in the absence of damping completely decouples the helicopter and load so that forces at the frequency will not be transmitted between the helicopter and load. By adjusting the above-identified parameters of the isolator 10 to decouple the load from the helicopter at that frequency, vertical bounce at the helicopter is eliminated. The adjustment of the parameters or tuning of the isolator for a particular frequency is, of course, made by varying the size and weight of the masses, including the fly weights, and the size and type of spring. Since the resonant frequency of the isolator occurs at a different point in the frequency spectrum from the anti-resonant frequency, consideration must be given to the effect that a parameter change will have on both frequencies. Adequate separation between the resonant and anti-resonant frequencies is desired.

Accordingly, the improved vibration isolator 10 has anti-resonant characteristics which make it useful in decoupling one body from another at a specific frequency to which the isolator is tuned. The isolator 10 is a passive device and it requires no external power source and there are no friction joints which require frequent service. The isolator components are also not seriously effected by environmental factors since they can be made of rubber, metal or other components that are capable of withstanding prolonged exposure to weather elements.

While the isolator 10 has been disclosed in a preferred embodiment it should be understood that numerous modifications and substitutions can be had to the isolator without departing from the spirit of the invention. For example, the cables 34, 36, 38, 50, 52 and 54 are illustrated as relatively flat, elongated members which may in fact be formed by a series of connected or separate cables or by straps. The term "cable" within the scope of the present invention is intended to include any elongated element having a relatively low bending modulus compared to its tensile strength so that it can bend freely over the curved surfaces of the masses 12 and 14 and support high tensile loads imposed by the load L. The fastening of the cables to the masses and couplings may be by a suitable clamp or other device. Although the two sets of cables 34, 36, 38 and 50, 52, 54 in effect provide limited redundancy through the isolator, it is also contemplated that auxiliary safety cables or straps may be connected directly between the couplings 24 and 26 in the event that the cables operating the masses 12 and 14 should fail. Of course, the auxiliary cables should have sufficient slack to allow the couplings 24 and 26 to move vertically relative to one another as the masses 12 and 14 rotate and the spring 16 flexes. Although the elastomeric spring is desirable, it is contemplated that hydraulic, pneumatic or mechanical springs may be utilized also. Accordingly, the present invention has been described in a preferred embodiment by way of illustration rather than limitation.

I claim:

1. An improved vibration isolator for reducing the transmission of vibrations at a given frequency between a first and a second body joined together by the isolator comprising:

a first inertial member having a given mass and at least two cylindrical surfaces having two different radii of curvature respectively and positioned coaxially about an axis of the first member;

a second inertial member having a given mass and at least two cylindrical surfaces having two different radii of curvature respectively and positioned coaxially about an axis of the second member, the second member being coaxially positioned relative to the first member with said axes of the members collinear;

resilient means interconnecting the coaxially positioned first and second members and permitting the members to rotate in opposite directions about the collinear axes relative to one another with resilient restraint;

first cable means connected at one end to the first inertial member and extending from the member tangentially of the one of the cylindrical surfaces having the larger radius of curvature for connection with the first body;

second cable means connected at one end to the first member and extending from the member tangentially of the other of the cylindrical surfaces having the smaller radius of curvature for connection with the second body;

third cable means connected at one end to the second inertial member and extending from the member tangentially of the one of the cylindrical surfaces having the larger radius of curvature for connection with the first body; and fourth cable means connected at one end to the second member and extending from the member tangentially of the other of the cylindrical surfaces having the smaller radius of curvature for connection with the second body;

said cable means being arranged relative to each other and to the inertial members to produce simultaneous translations of the members in the same direction along the cable means and rotations of the members in opposite directions about the collinear axes.

2. The improved vibration isolator of claim 1 including:

a first coupler for connection with the first body;

a second coupler for connection with the second body; and wherein:

the first and third cable means are connected to the first coupler at the ends opposite the first and second members respectively; and the second and fourth cable means are connected to the second coupler at the ends opposite the first and second members respectively.

3. The vibration isolator of claim 1 wherein:

the first and second inertial members and the resilient means are tuned for anti-resonance at a given frequency.

4. The improved vibration isolator of claim 1 wherein:

the first inertial member has three cylindrical surfaces positioned coaxially of the axis of the first member, two of the cylindrical surfaces having the same radius of curvature and the third cylindrical surface having a different radius of curvature and being interposed between the other two cylindrical surfaces;

the first and second cable means extend tangentially from two of the cylindrical surfaces respectively having different radii of curvature; and fifth cable means is connected to the first inertial member and extends tangentially of the remaining cylindrical surface in the same manner as the cable means extending from the other cylindrical surface having the same radius of curvature.

5. The improved vibration isolator of claim 4 wherein:

the second inertial member has three cylindrical surfaces with the same radii of curvature and relative positioning on the member as the cylindrical surfaces on the first inertial member;

the third and fourth cable means are connected to the second member and extend tangentially from two of the cylindrical surfaces respectively having different radii of curvature; and sixth cable means connects with the second member and extends from the remaining cylindrical surface in the same manner as the cable means extending from the other cylindrical surface having the same radius of curvature.

6. The improved vibration isolator of claim 1 wherein:

the first and second cable means extend tangentially from the cylindrical surfaces on the first inertial member at points of tangency on one side of the collinear axes of the members; and the third and fourth cable means extend tangentially from the cylindrical surfaces of the second inertial member at points of tangency on the side of the collinear axes diametrically opposite said one side.

7. An improved vibration isolator as defined in claim 1 wherein:

the resilient means comprises an elastomeric spring connected between the coaxial first and second inertial members.

8. An improved vibration isolator as in claim 7 wherein the elastomeric spring is annular and is connected between the inertial members coaxially of the axes of the inertial members.

9. The improved vibrator isolator of claim 1 wherein:
the first and second inertial members are similar in shape, and the radii of curvature of corresponding cylindrical surfaces on the members are respectively equal.

10. An improved vibration isolator as in claim 1 wherein:
a first set of fly weights is mounted on the first inertial member; and
a second set of fly weights is mounted on the second inertial member.

11. An improved vibration isolator as defined in claim 1 wherein:
the resilient means is an annular, elastomeric spring having a trapezoidal cross section, the spring being connected coaxially between the first and second inertial members with the longer parallel side of the trapezoid defined by the cross section being positioned farthest from and parallel with the axes of the coaxial inertial members, and the shorter parallel side positioned closest to and parallel with the axes of the inertial members.

* * * * *